April 7, 1942.  I. TORNBERG ET AL  2,279,270
NEWSPAPER STUFFING MACHINE
Filed April 7, 1941  10 Sheets-Sheet 6
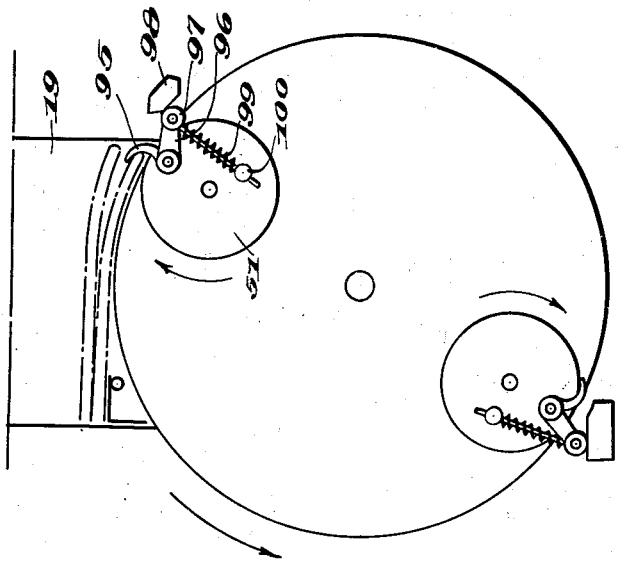
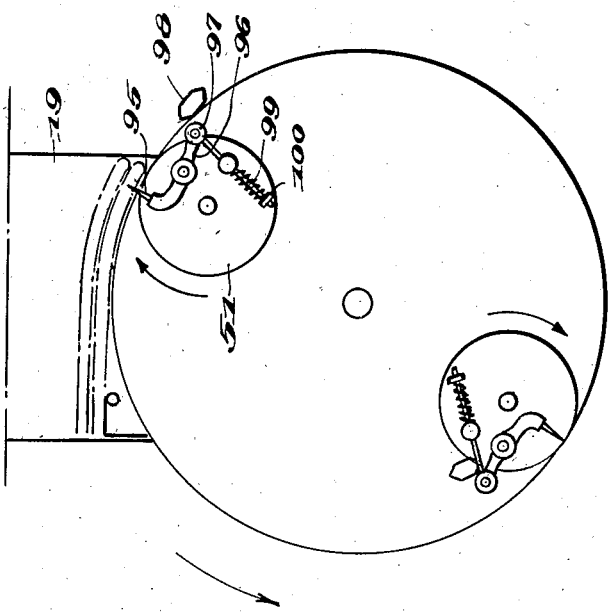
Inventors
ISIDOR TORNBERG,
H. C. JORDHOY,
By Riordan & Riordan
Attorneys.

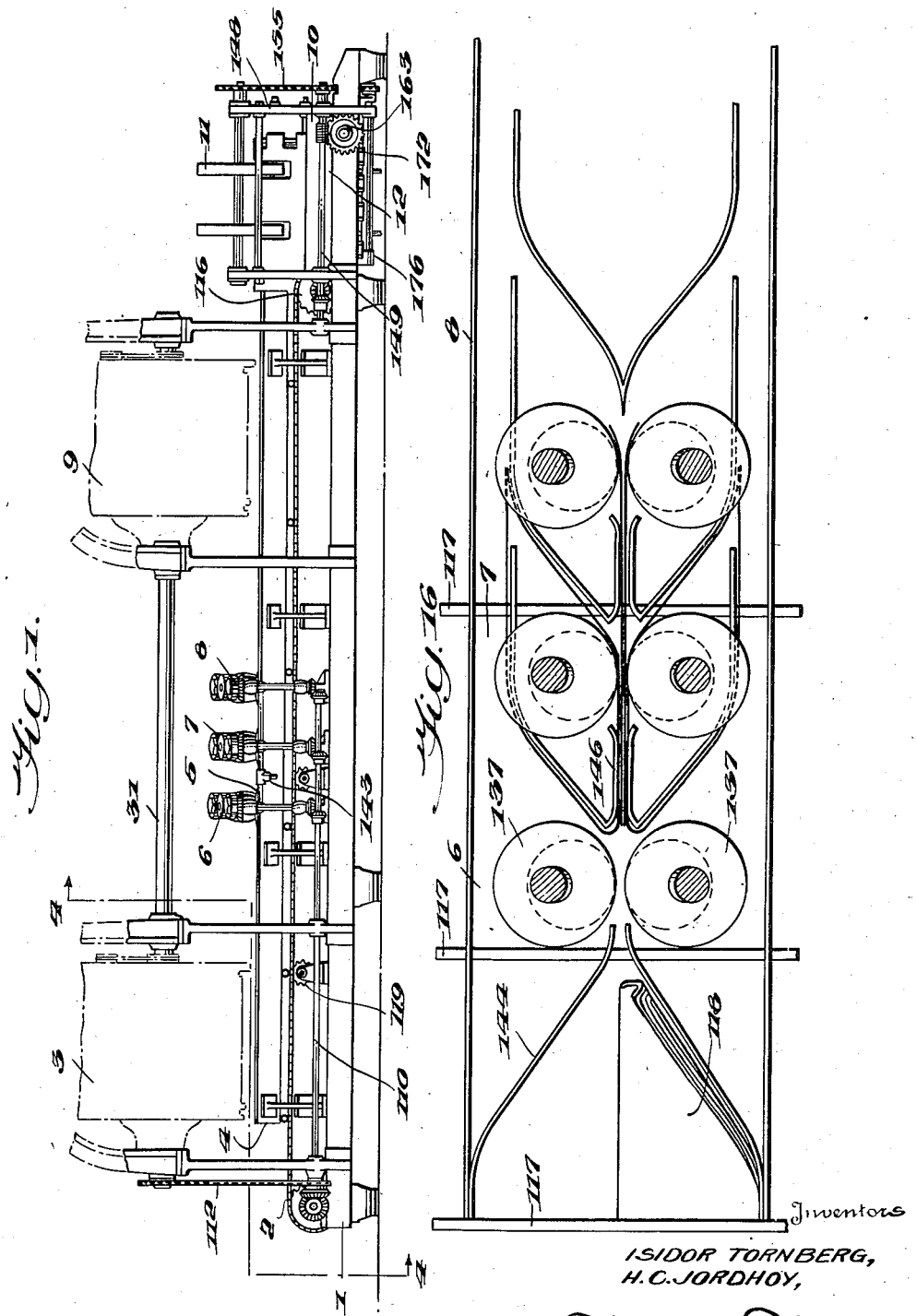

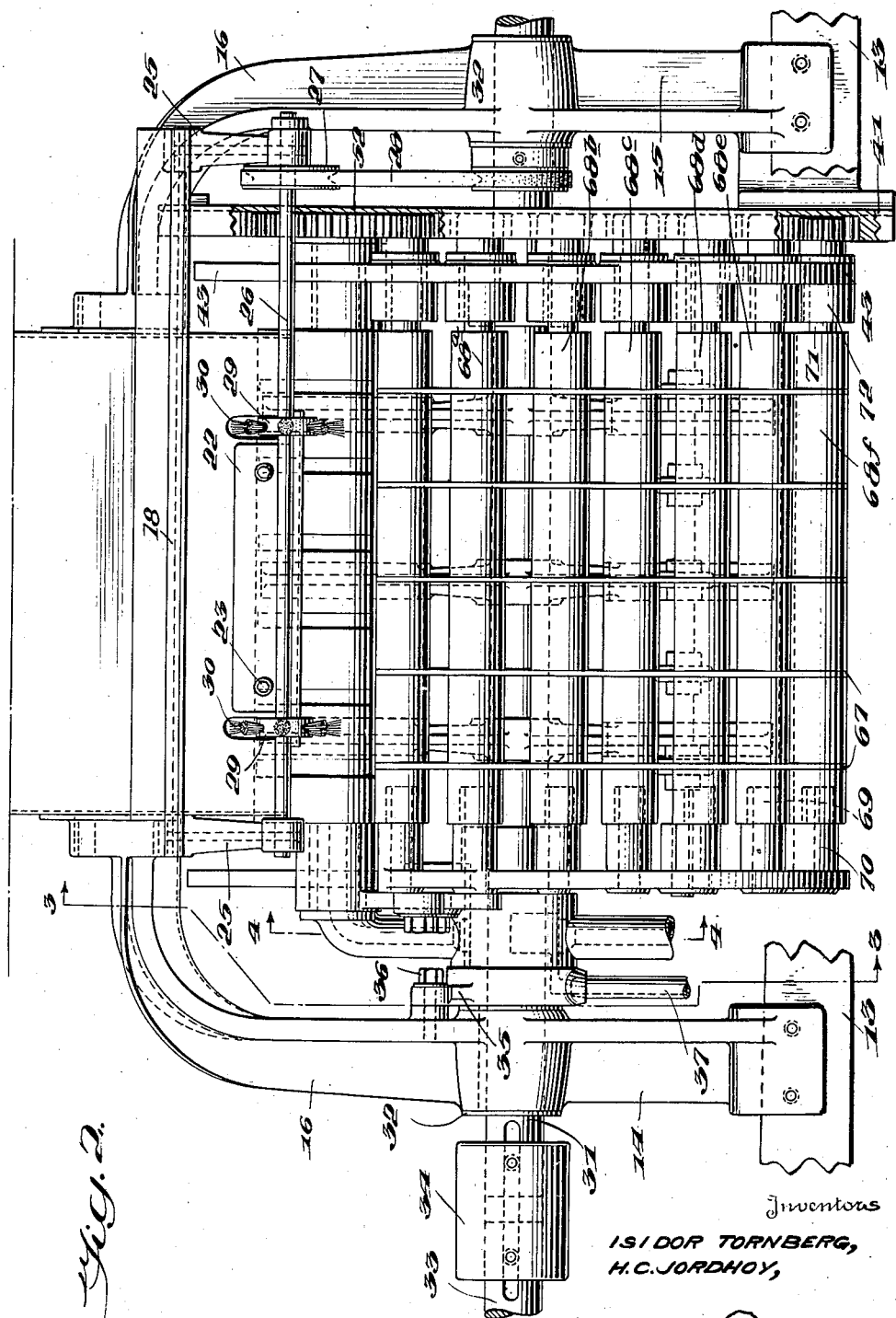

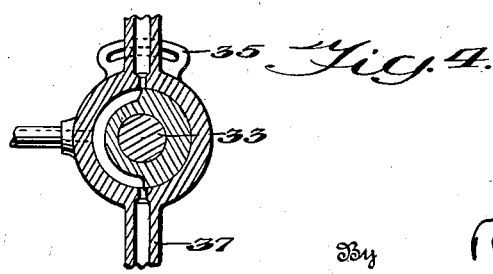

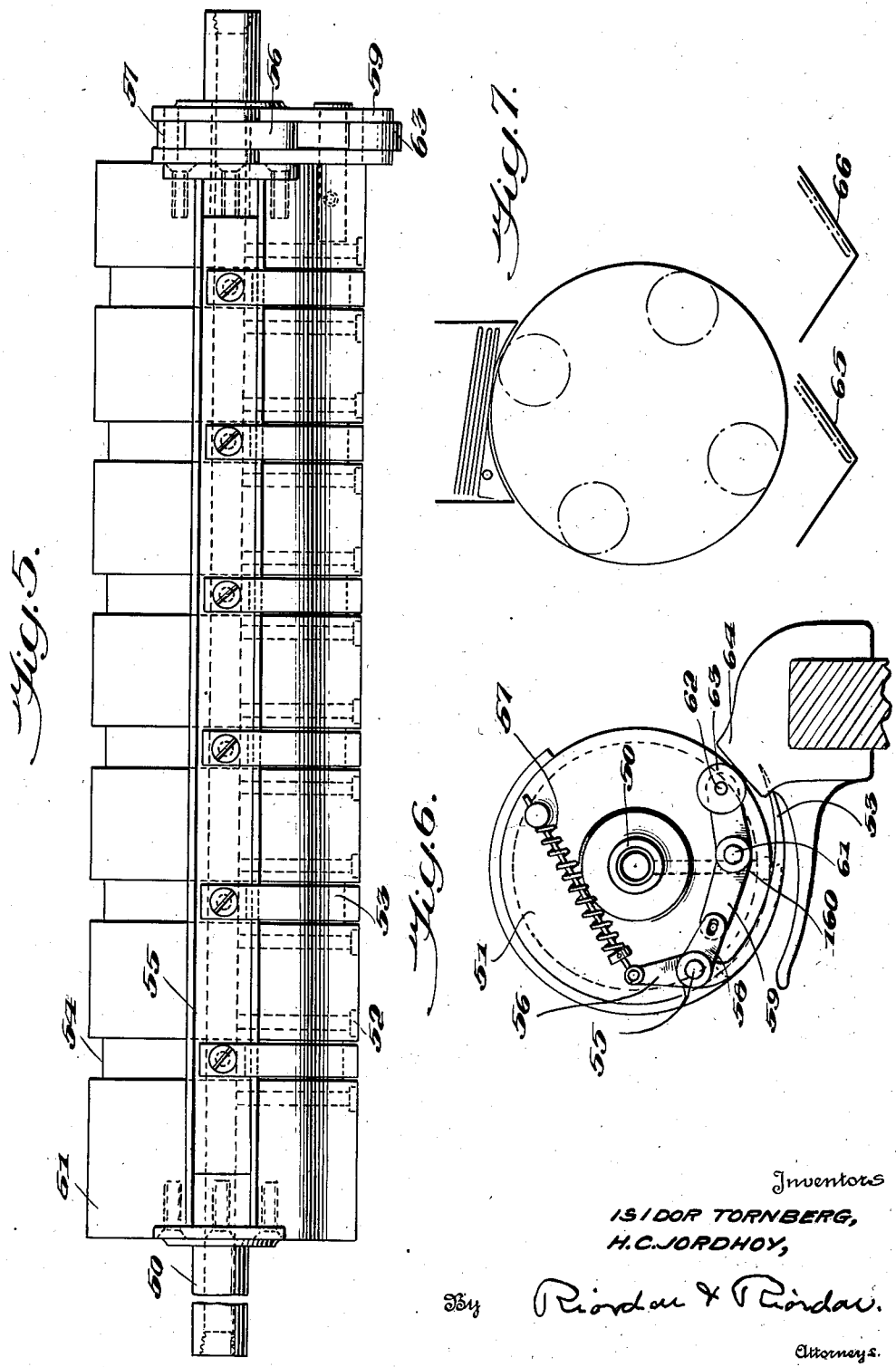

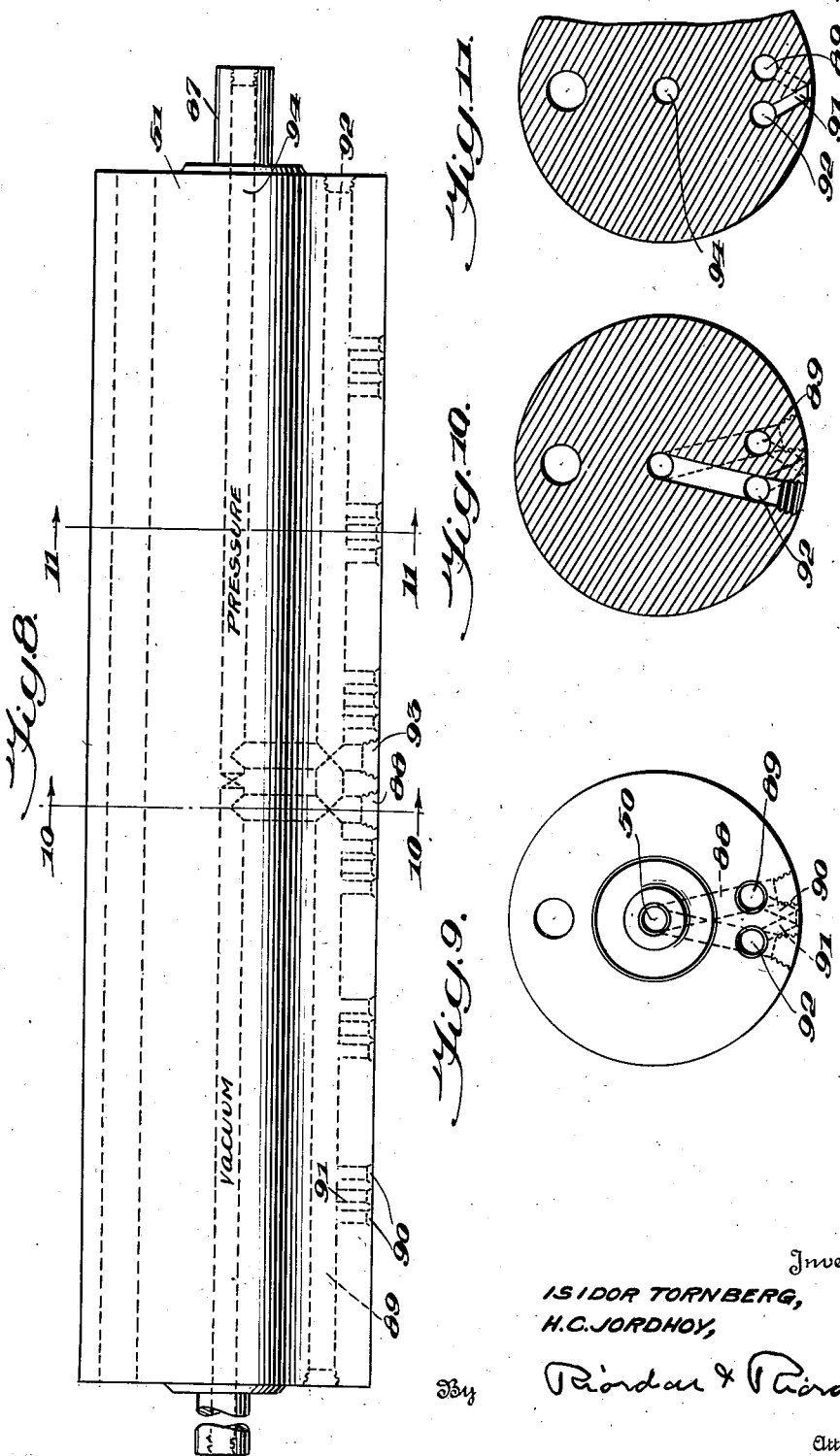

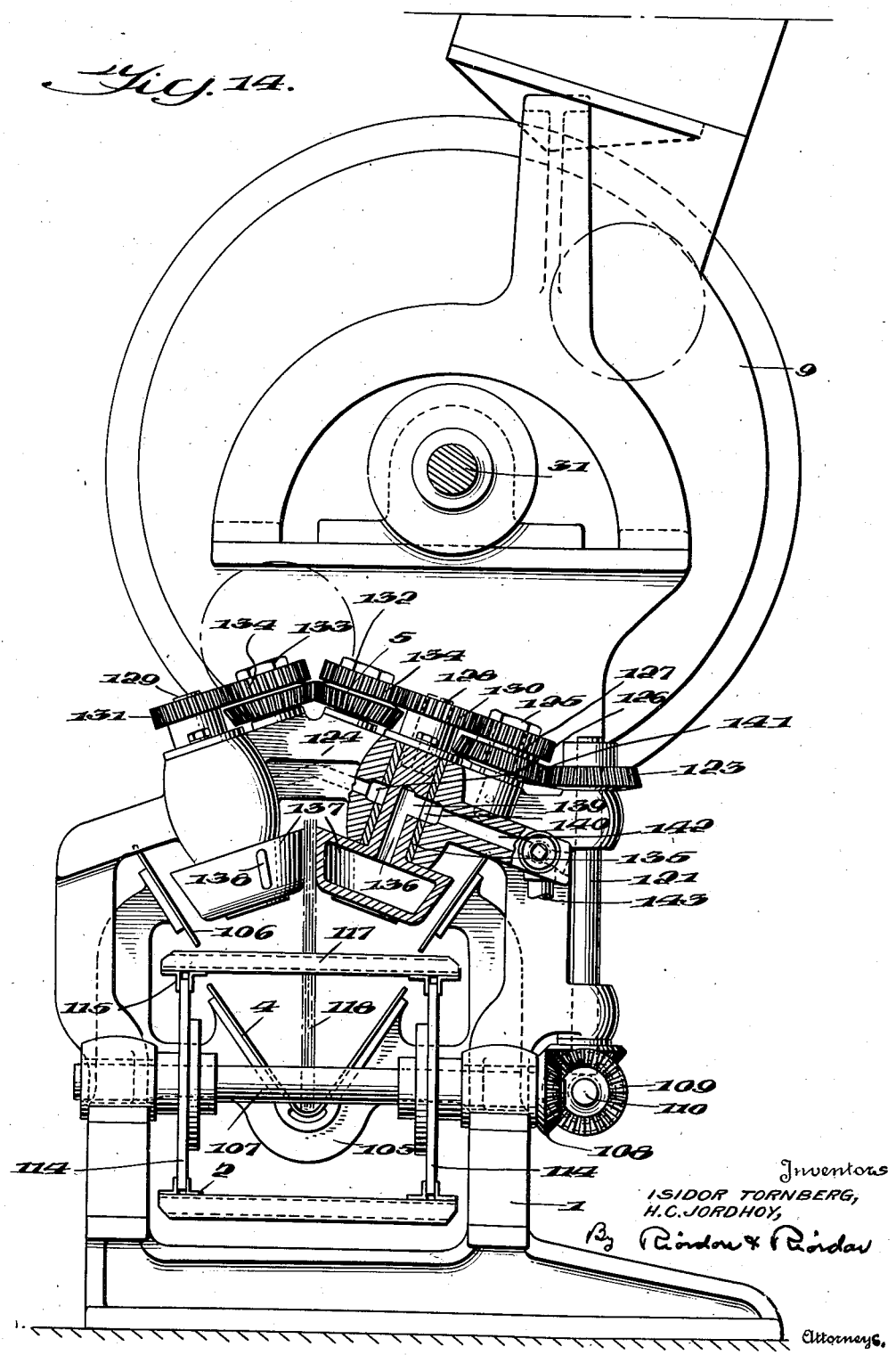

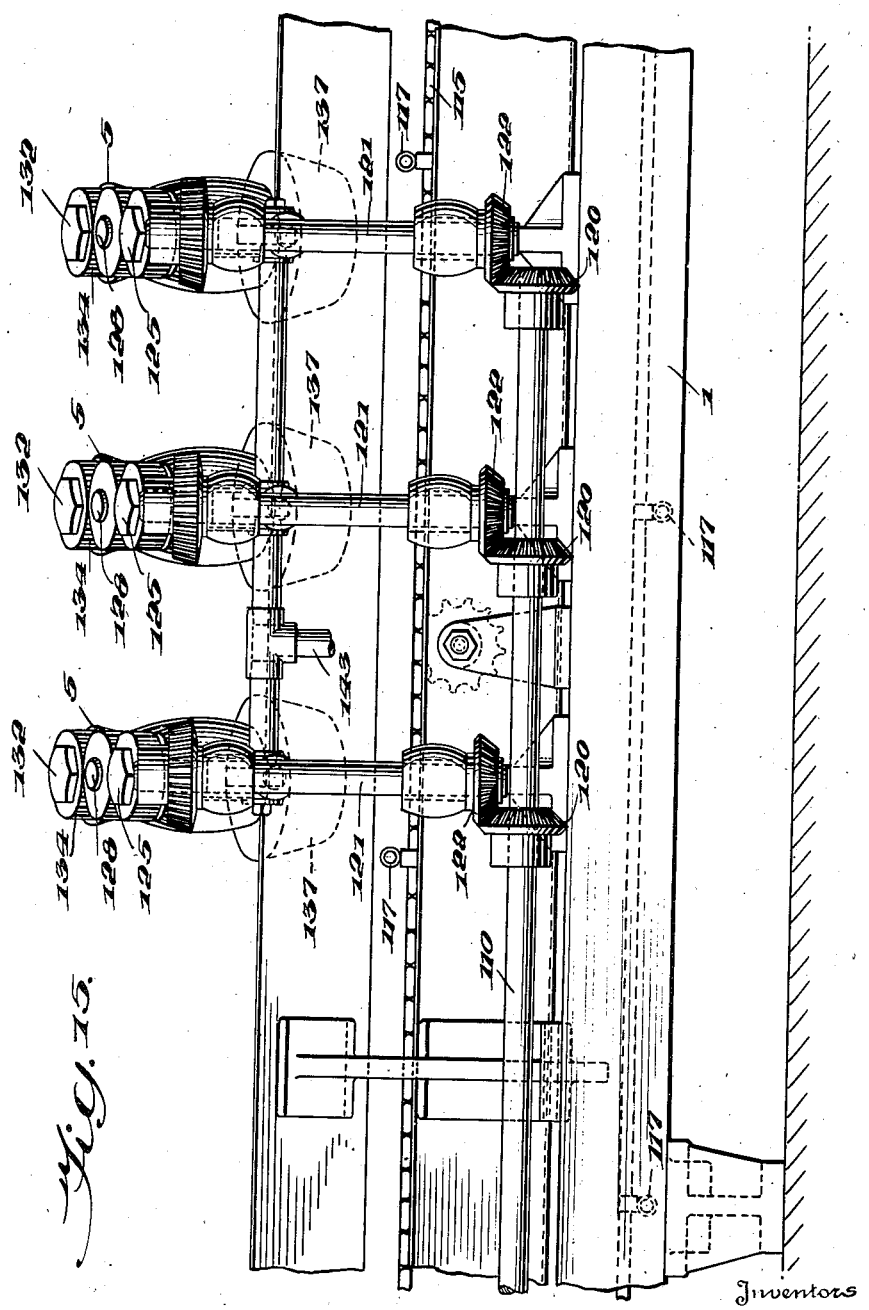

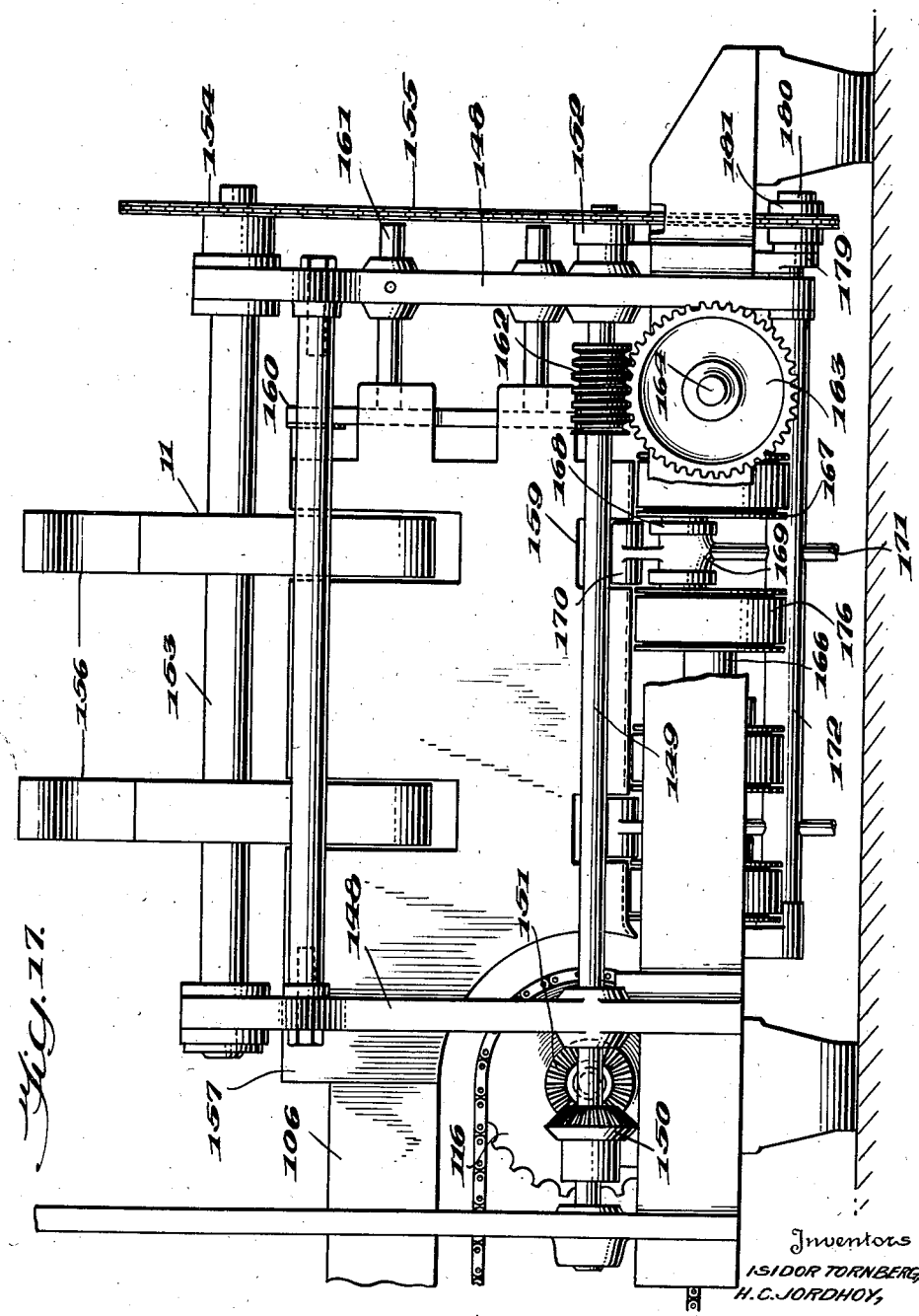

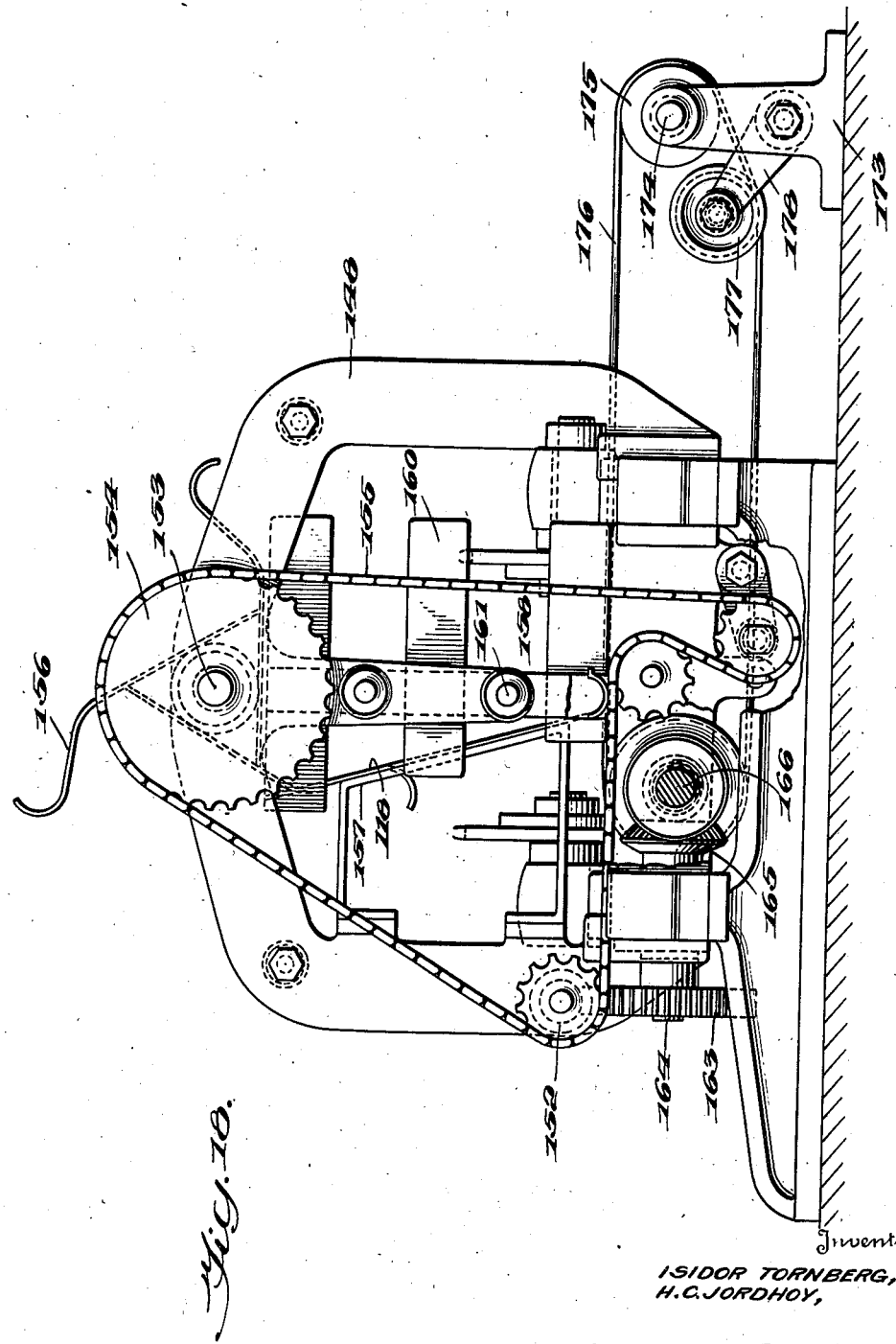

Patented Apr. 7, 1942

2,279,270

UNITED STATES PATENT OFFICE 2,279,270

NEWSPAPER STUFFING MACHINE

Isidor Tornberg, Plainfield, and Hans C. Jordhoy, North Plainfield, N. J., assignors to Wood Newspaper Machinery Corporation, Plainfield, N. J., a corporation of Virginia Application April 7, 1941, Serial No. 387,330

16 Claims. (Cl. 270—57)

The invention of which the following is a detailed description, relates to mechanism for handling articles. Generally speaking our purpose is to provide a unitary machine for continuously stuffing newspapers, that is, assembling the individual newspaper sections in any desired order and delivering the completely assembled newspaper as a unit. To carry out this purpose we provide means to separate a folded section or "book" of sections of a newspaper or the like from a stack, deposit it upon a moving belt conveyor, in the case of a book unfold each section successively and insert another section. The operations of unfolding and insertion of new sections are repeated as many times as it is necessary to complete the assembly. In the case of a newspaper this assembly is normally completed by three inserting operations. Finally the complete newspapers or books are refolded and delivered in an overlapping pile. Such mechanism is particularly useful in conjunction with machines for stuffing newspapers such as are disclosed in the copending application of Isidor Tornberg for patent on a rotary stuffing machine, filed February 15, 1940, Serial No. 319,177.

Incidental to the operation of stuffing or inserting one or more sections of a folded newspaper within another unfolded section, it is desirable to arrange mechanism by which the section or sections to be inserted may be withdrawn from a stack, transferred and placed within the unfolded section. It is an object of our invention to provide efficient means for mechanically withdrawing a flat article such as a folded newspaper section from the bottom of a stack without disturbing the position of the superior sections in the stack.

It is also an object of our invention to effectively grasp the lowermost section or article and transfer it rapidly and compactly to a delivery point from which it will be released to fall as intended in place for subsequent assembly with other like sections.

A further object of our invention is to provide means for positively engaging an edge of the section to be inserted and peeling it from the stack retaining the grasp on the section throughout the period of transport and releasing it in timed sequence at the point of delivery.

In carrying out the above and other incidental objects of our invention it is to be assumed that the general purpose is to assemble a composite newspaper which will consist of one or more assembled outer folded sections and an article which is to be inserted within the first named section when the latter has been unfolded. The inserted article may consist of one or more similar folded sections of a newspaper. In carrying out these objects folded newspaper sections must be fed individually from the open base of hoppers. If the individual sections are the ones which will ultimately be the outer sections of the assembled newspaper, these sections as fed must be delivered in place upon a conveying means and opened up to receive inserted sections. Our invention is applicable to feeding the sections whether they are to form the outer enclosing sections or merely the inserted inner sections. The operation starts with engaging the folded edge of the lowermost section of a stack and peeling that section from the stack without dragging the next adjacent section out of its position or imposing any frictional pull upon it.

The engaging operation is followed by rolling or coiling the section compactly during its transfer to a selected delivery station. At the latter position the engagement is broken allowing the transferred section to fall into place upon the conveyor or the like where it will either form an enclosing section or an inserted section within such enclosing section.

The action of separating the section from the stack may be termed that of peeling in that we use a rotary roll having means either pneumatic or mechanical for grasping the folded or leading edge of the section and thereafter moving in an orbit or circular path. By the continued rotation of the roll the section is transferred to the point of delivery at another point in the orbit of the roll. Finally on arrival at the delivery point, the holding or gripping means is automatically released and the section falls by gravity with its folded edge leading to the place where it is received for opening or placement within a section already delivered and opened.

Incidental to the withdrawal of the lowermost section from the stack, means are provided for supporting the next lowermost or superior section in place without unnecessary frictional drag or dislocation so that it will be in position to be gripped in its turn.

A further object of our invention is to prepare the section as delivered to the moving work surface and directing its travel thereover, for receiving one or more inserted sections. In carrying out this purpose the initial section is unfolded to receive a second inserted section. In the case of a book the unfolding operation is repeated for each section in the book prior to the insertion of the new section.

One of the important objects of the invention is to receive the completely assembled newspapers at a work position where they will be first refolded and then delivered in an overlapping pile or order.

As exemplifying the preferred form of our invention we have shown in the accompanying drawings one embodiment. On these drawings—

Fig. 1 is a diagrammatic side elevation on a reduced scale of the complete newspaper stuffing machine;

Fig. 2 is a side elevation of one feeder unit for newspaper sections;

Fig. 3 is a transverse section on the line 3—3 of Fig. 2;

Fig. 4 is a vertical section on the line 4—4 of Fig. 2 showing vacuum connections for the gripping rollers;

Fig. 5 is a side view of one vacuum operated gripping roller;

Fig. 6 is an end view of the same;

Fig. 7 is a diagrammatic side view of the mechanism showing delivery of sections to a plurality of parallel conveyors;

Fig. 8 is a side view of a modified form of the peeling or gripping roller;

Fig. 9 is an end view of the same;

Fig. 10 is a transverse section of this roller taken on the line 10—10 of Fig. 8;

Fig. 11 is a similar transverse section of the roller taken on the line 11—11 of Fig. 8;

Fig. 12 is a diagrammatic side view of the mechanism showing use of gripping fingers for peeling the lowermost folded newspaper from the stack;

Fig. 13 is a diagrammatic side view showing the use of gripping pins for the same purpose;

Fig. 14 is a front end elevation of the complete machine partly in section, taken on the line 4—4 of Fig. 1 showing the first opening unit;

Fig. 15 is a side elevation of the first opening unit;

Fig. 16 is a schematic plan view of the opening unit;

Fig. 17 is a side elevation of the closing unit and

Fig. 18 is a rear end elevation of the closing unit.

Generally speaking the machine comprises a foundation frame 1 relatively long and supporting an endless conveyor 2. At one end the conveyor passes beneath a feeding unit 3 by which folded sections of a newspaper are successively peeled from the bottom of a stack and deposited upon a work surface in the form of a trough 4 that extends lengthwise of the machine.

As the folded newspaper section is carried along it passes through an opener 5 in which the section is unfolded or in the case of a book each section is successively unfolded by separate opening devices 6, 7 and 8.

The unfolded section or group of sections in the case of a book, then travel beneath a second feeding unit 9 where a further inserted section is deposited within the unfolded section or book. The opening operation may then be repeated on the innermost section and a third feeding unit may add another insert. These operations are repeated in the above cycle as many times as is found necessary or desirable.

At the end of the conveyor travel the unfolded sections with the inserts are pushed along the trough over an endless belt conveyor 10 and at the same time folding means 11 closes the opened sections of the assembled newspaper. This is followed by the operation of a lifter and pusher 12 which will lift the paper out of the trough, push it a considerable distance away from the trough and deposit it on the delivery conveyor.

The feeding unit is supported on any suitable cross bars or beams 13, 13 and is located generally above the stuffing conveyor.

Mounted upon beams 13, 13 are two frame members 14 and 15. The upper portions 16, 16 curve inward toward each other parallel to the general longitudinal axis of the machine. A shelf 18 having an open bottom bridges the space between the ends 16, 16. This shelf slopes as indicated in Fig. 3 and supports the hopper 19 having an open bottom. The hopper is proportioned to receive a stack of folded newspaper sections which will lie flat across the bottom of the hopper. The stack of sections rests with the lowermost having its leading folded edge against the back of the hopper while the opposite free edge rests directly on a ledge 20. The ledge serves to support the stack at this point subject to the tilting movement of the lowermost section. As the leading or folded edge of the lowermost section falls downwardly, the opposite free edge escapes from the ledge 20 and rests upon a roll 21. The back wall of the hopper 19 carries a plate 22 which extends substantially the full length of the wall of the hopper. The upper portion of the plate 22 is of limited length as shown in Fig. 3 and held in an adjusted position by the bolts 23.

The lower edge of the plate 22 has an inturned lip 24 shown in Fig. 3. This serves as a rest for the leading folded edge of the bottom section.

The back of the hopper 19 carries a pair of brackets 25. Journalled in these brackets is a rotary shaft 26 carrying a pulley 27 receiving power from the belt 28.

Suitably spaced along the shaft 26 are circular brushes 29, 29. These brushes are of sufficient length to extend through slots 30, 30 in the back of the hopper 19. The shaft 26 is arranged to rotate relatively slowly and the brushes serve to engage the folded edge of the lower sections of the stack and bring them down so that the lowermost is in position to be engaged by the gripping roller and the next section temporarily rests upon the lip 24 while the others are in position to replace the lowermost section in that position as the latter in turn is removed.

The rotary shaft 31 is journalled in bearings 32, 32 in the frame members 14 and 15. The shaft 31 is connected to adjacent shaft sections 33 at one or both ends by means of couplings 34. In this manner shaft 31 may receive power from shaft 33 or under certain circumstances shaft 31 may transmit power to an adjacent feeding unit.

As shown in Fig. 2 the frame 14 carries a stationary bracket 35 capable of rocking adjustment around the lock nut 36 as indicated in dotted lines on Fig. 3. This bracket 35 is connected to the vacuum line 37 and contains a passageway 38. Forming part of the bracket 35 is the stationary sleeve 39. This sleeve surrounds the rotary shaft 31 and forms an extension of one bearing 32. The sleeve is recessed to form a chamber 40. This chamber extends half around the sleeve and is connected by passageway 38 to the vacuum line 37.

Mounted on the opposite frame members 15 and 16 is a fixed internal ring gear 41 concentric with shaft 31. This gear forms an internal track along which pinions travel in an orbit and transmit rotary motion to the operative parts of the gripping and transferring element as well as to the means for supporting the sections in the stack.

Spiders 42, 43 are carried on shaft 31 and form the ends of an open drum. The parts of the spider are cut away on opposite sides to form recesses for the devices which engage the articles to be transferred. These recesses are bounded on the inside by curved guards 44 (Fig. 3). The spiders carry bearing plates 45 extending radially outside of the spiders 42 and 43. Centrally of the bearing plates are the journal bearings 46. Bracket plates 45 on spider 42 have manifolds 47 covering the ends of the bearings 46. These manifolds connect with the opposite sides of a collar 48. This collar rotates with the yoke 42 around stationary sleeve 39 as a journal bearing. On the inner surface of the collar 48 the manifolds 47 have inlet ports 49. These ports are relatively narrow in a circumferential direction but relatively long in the direction of the axis of shaft 31. This design is selected in order that connection of the ports 49 to the vacuum chamber 36 shall be accomplished in a minimum angular travel but without diminishing the cross-sectional area of the port to be evacuated. Thus the vacuum is applied through the manifold 47 in the shortest possible time and with the greatest effectiveness.

The bearings 46 carry the hollow shaft 50 which forms part of the gripping cylinder 51. One end of the hollow shaft is closed but the other one passes through the bearing 46 and is in communication with the manifold 47.

The closed end of the shaft carries a pinion 52 which is in engagement with the ring gear 41. The pinion 52 has a pitch diameter one-fourth that of the ring gear 41 so that the shaft 50 rotates four times during its orbital travel around the ring 41.

The hollow shaft 50 has a series of radial passageways 52 which form a line of openings longitudinally of cylinder 51 as shown by dotted lines in Fig. 5. These openings apply vacuum transmitted through the hollow shaft 50 and the manifold 47 when the shaft 31, spider 42 and appropriate manifold 47 pass over the open vacuum chamber 36 in the stationary sleeve 39. The operation of the vacuum ports 52 is interrupted by lifting fingers which break the vacuum. In Figs. 5 and 6 we have shown these devices to be fingers 53 which rest normally within peripheral channels 54 of the cylinder 51. These fingers are attached to a rock shaft 55 journalled in opposite ends of the cylinder 51 and lying parallel to shaft 50. Shaft 55 carries a bell crank lever 56, one end of which is held inwardly by means of a plunger and spring 57. The opposite end 58 of the lever has a slotted connection with an end 59 of a second lever 60. Lever 60 is carried upon a stud 61 on the end of cylinder 51. The free end of the rock lever 59 carries a stud 62 and a roller 63. Roller 63, in its normal travel contacts stop 64 on the frame beam 13. As roller 63 rides over stop 64 the leverage compresses spring 57 and permits fingers 53 to move outwardly from cylinder 51. This pushes the paper section away from the vacuum outlets and causes it to drop to the trough below.

Figures 2 and 3 show two vacuum rolls mounted diametrically. Figure 7 shows how rolls may be disposed in such fashion as to transfer successive sections to alternate conveyors 65, 66. In this latter instance four vacuum rolls are disposed at equal distances around the main cylinder.

The main cylinder or drum is provided with guard belts 67, 67. These belts are of any desired number equally spaced longitudinally of the device. Their purpose is to prevent a section from the stack from falling into the cylinder during and subsequent to the peeling of the lowermost section from the stack.

For this purpose the spiders 42, 43 carry two series of rolls 68. Each series of rolls is of any suitable number and indicated in Fig. 3 as 68a—68h. These rolls are arranged tangential to the drum ends 42. The left end of each drum as shown in Fig. 2 revolves around the pin 69 which is held within the fixed bushing 70 on the spider 42. The pin 69 may be removed from the bushing 70 in order to permit removal of the individual rolls. At the opposite end each roll has a shaft 71 extending through removable bushings 72 in the spider 43. At the end of the shaft 71 there is the pinion 73 in mesh with the fixed ring gear 41. By removing the pin 69 and the bushing 72, the pinion 73 is disengaged from the ring gear 41 and the roll may then be removed.

In order to adjust the spacing of the bands 67 from the vacuum rolls 51, additional rolls 74 are mounted at opposite ends of the series of rolls 68a—68h. Rolls 74 are mounted in bearings 75 on arms 76. Arms 76 are mounted on plates 45 at the pivots 77 and the arms have intermediate slots 78 permitting adjustment around studs 79.

On spider 43 the arms 80 are pivoted at an intermediate point 81 and move around an adjustment 82 at the inner end opposite the bearing for the roll 74. In this way the roll 74 may be adjusted to and from the vacuum rolls 51 and when the latter are to be removed the arm 76 may be swung out to afford clearance for the removal of the drums 51.

The bands 67 travel through grooves 83 in the rolls 68 and 74. Within the periphery of the drum, the bands 67 return around idle pulleys 84 carried in bearings 85. The reason for running the bands over rolls 84 is that the surface movement of the rolls is opposite to the direction of movement of the paper around the adjacent vacuum roll. If not pulled out of the way the bands would interfere with the paper section and might pull it free from the suction.

The prime object of the bands of course is to prevent the lowermost section from dropping except when engaged by the vacuum rolls. The rolls 68 and bands 67 may be considered as a moving retainer for the stack free from friction.

On Fig. 3 has been shown a guard 86 which serves to hold the free edge of the coiled paper from flying away from the vacuum roll so that the paper section is constrained to travel around with the vacuum roll until released from the vacuum by the lifting fingers and dropped to the receiving trough.

On Fig. 8 we have shown a modified form of vacuum roll 61. In this instance vacuum is exerted through the hollow shaft 50 while the opposite end 87 of the shaft is connected to a source of pneumatic pressure in the same manner as shown in Figs. 2 and 3 for vacuum. The vacuum passage extends radially as at 88 to a manifold 89 which is connected to ports 90 uniformly distributed in pairs along the length of the vacuum roll.

Intermediate each pair of vacuum ports 90 is a port 91 connected by manifold 92 to the radial passageway 93 which in turn connects with the central passageway 94 running through the end 87 of the shaft and connected with the source of air pressure.

This arrangement substitutes compressed air for the mechanical motion of the lifting fingers in releasing the sheets from the vacuum roll. As the vacuum roll rotates the connection with the vacuum is broken and simultaneously connection established with a source of air pressure causing the paper to be released from the roll at the proper time.

In Fig. 12 we have shown curved spring fingers 95 journalled on a shaft in the vacuum roll 51. An arm 96 has a roller 97 at its free end which contacts with a fixed cam 98.

The roller and arm 96 are urged outwardly by compression of spring 99 operating against abutment 100 on the end of the vacuum roll. One fixed cam 98 is placed in advance of the hopper 19 and the other at the point of delivery. As the roller 97 strikes cam 98 in advance of the hopper, the curved fingers 95 engage the leading folded edge of the bottom paper section and insure the holding movement against the roll. The action of the cam is to open the fingers 95 against the force of the spring until the newspaper section is engaged after which the roller passes beyond the cam 98 and the spring holds the folded edge of the section against the roll.

At the point of delivery the arm 96 is thrown back against the spring by the second cam 98 and the leading edge of the section falls away from the roll and the section then falls into place upon the receiving conveyor.

Fig. 13 shows a further modification in which pins are used for engaging the newspaper section instead of suction or grippers. The rolls carry rock arms 96 with roller 97 and at their opposite ends radially projecting pins 99. The rock arms 96 have springs 100 surrounding bars 101. These springs extend from a stop 102 on the rolls to stops 103 on the free ends of the rods. Accordingly, the arm 96 is held retracted with the pins 99 projecting. As the roll follows an orbital movement the pins 99 pierce the leading edge of the lowermost paper section. At the same time roller 97 passes over cam 98 and gives a positive movement to the pins thus insuring secure engagement with the paper section.

The projecting pins carry the paper section around the roll 51 in its orbital movement with the pins and paper sections still in engagement until the delivery point is reached. At this point a fixed cam 104 overcomes the force of spring 100 and fully retracts the pins thus releasing the paper section for delivery to the appropriate conveyor.

The mechanism above described operates to withdraw by peeling, the lowermost newspaper section in the stack, coil it in the manner described around the transfer drums 51 and at the point of delivery release the section for positioning on the trough below.

The means for opening the folded sections received on the trough 4 is illustrated more particularly in Figs. 14 and 15. Divided brackets 105 support the sides of the trough 4. Side pieces 106 form extensions for the trough 4 and spaced from its upper side edges. These side pieces 106 are also supported upon the brackets of the foundation.

At the head end of the foundation there is provided a cross-shaft 107 journalled on the opposite sides of the foundation or frame 1. One end of the shaft 107 is extended outside of the frame 1 and carries a keyed bevel gear 108. A corresponding bevel gear 109 is in mesh with gear 108. Gear 109 is keyed to a shaft 110 journalled on the frame 1. Back of the gear 109 is a small sprocket wheel 111 connected by chain 112 to a sprocket wheel 113 on the shaft 31 of the feeding cylinder.

Sprocket 111 makes two revolutions for each revolution of sprocket wheel 113. This ratio is selected in order to time the action of the opening cones with the deposit of sections in the trough.

Shaft 107 has a pair of spaced sprocket wheels 114. Chains 115 travel over the wheels 114 and for the full length of the trough as shown in Fig. 1. At the opposite end of the trough chains 115 pass around sprocket wheels 116 and thus return to wheels 114.

Suitably spaced on chains 115 are a series of pusher bars 117. These bars pass between the sides of trough 4 and the side pieces 106 as shown in Fig. 14. Each pusher bar engages the unfolded side edge of the paper section 118. As indicated in Fig. 14 this paper section rests upon its intermediate folded edge in the base of the trough 4.

Idlers 119 support the upper flight of the chains 115 at suitable spaced intervals.

By the above arrangement the endless conveyor 2 travels continuously to advance the paper sections along the length of the trough 4 and from whichever position they are deposited by the feeding units 3 or 9.

The first feeding unit drops the outside paper called the cover section. This section may be made up of one, two or three sections which are folded together with a half-page fold. In the case of several sections it is necessary to open all of these before any inserts can be dropped in. For this reason it is necessary that some mechanism be provided that will open the cover section before it reaches the first inserting unit. Guides must also be provided to keep the unfolded sections from closing until they have passed the last inserting unit. This mechanism is the opener unit and is located between the depositing unit 3 and successive inserting units 9. We have provided an opener unit which will be automatic to the extent that at no time will it be necessary to make any changes or adjustments regardless of whether the cover section consists of one, two or three folded sections, or whether the cover section is light or heavy or whether the stuffed back encloses a single or plurality of insert sections.

The first feeding unit 3 drops the outside section which will be referred to as the cover section. This section passes along the trough into the second or opener section where the half-page fold of the cover section and any inserted sections are unfolded and held open. The unfolded sections then pass on to the third unit which is the second feeding or first inserting unit. There may be several such units each feeding an insert section and the number of units will be limited only by the required number of inserts.

The final assembled newspaper or book will then pass on to the delivery unit which will close or refold the cover section on the inserts and deliver the stuffed papers. The opener section 5 receives power from the cylinder shaft 31 by the sprocket 110, chain 112, sprocket 113 and shaft 110. A series of spaced miter gears 120 are keyed on shaft 110 each one being beneath a short vertical shaft 121 which is journalled in the side of frame 1 and has a corresponding miter gear 122. The upper end of shaft 121 carries a bevel gear 123. A cross-frame 124 of the frame carries a stud shaft 125. This shaft has an idler comprising a lower bevel gear 126 and an upper spur gear 127. Gear 126 meshes with gear 123.

A pair of opener shafts 128, 129 are journalled in the cross-frame 124 at inclinations to the vertical as shown in Fig. 14. Shaft 128 carries a spur gear 130 in mesh with gear 127. A similar spur gear 131 is keyed likewise to shaft 129.

The cross-frame 124 has two stud shafts 132 and 133 intermediate the shafts 128 and 129. Each stud shaft carries a combined bevel and spur gear 134 similar to the gears 126 and 127. Gears 126, 127, 128, 134 and 131 constitute a train by which gear 123 rotates both shafts 128 in opposite directions and at speeds identical with that of shafts 110 and 121.

The shafts 128 rotate within bushings 135 as shown in Fig. 14. The shafts have axial passageways 136 into the hollow cones 137. The cones have slotted openings 138 arranged to meet face to face during the rotation of shafts 128, 129. The cones are spaced approximately one-quarter of an inch apart at their nearest points although this spacing may be varied in accordance with requirements.

Shafts 128 and 129 each have radial bores 139 which register with similar openings 140 in the bushings 135.

Bushings 135 may be adjusted radially and thus vary the timing of the registry of bores 139 and openings 140.

Surrounding the mid-portion of the bearings containing the bushings 135 there is a cored passageway 141. These passageways are connected as indicated on dotted lines in Fig. 14 and one of them extends as indicated in 142 to connect with a vacuum line 143. In this way vacuum is applied through the slotted openings 138 during part of the rotation of the cones 137, dependent upon registration between the bores 139 and the openings 140.

Fig. 16 shows graphically the arrangement of the opening units and their operation. The trough 4 carries a pair of centering guides 144 in advance of the first opening device 6. These guides form a throat which brings the paper section 118 into the space between the cones 137, 137 due to the forward movement of the push rods 117.

Between the opening devices 6 and 7 and also between the opening units 7 and 8 means are provided for spreading the leaves engaged by the cones 137, 137 and at the same time centering those folded leaves which are inside the outer ones engaged. Thus the spreading guides 145 diverge from a point near the preceding opening device and extend beyond the cones of the succeeding opening device so that the outer folded sheet engaged by the preceding cones will be directed outside and around the succeeding separating cones.

Joining the front edges of the spreading guides 145 are centering guides 146 which constitute a throat feeding the inner section or sections of the paper between the succeeding opening device.

Beyond the last opening device 8 a pair of divergent spreaders 147 guide the separated portions of the innermost folded leaf in opposite directions and toward the outer sides of the trough.

Assuming three folded sections to be fed, the opening device 6 will divert the outer or cover section to the sides of the trough thus opening this section. At the same time the center section and innermost section not being affected by the opening device 6 will be directed between the cones of the opening device 7. Here the center section will be unfolded and its portions spread out so as to join the cover section resting on the sides of the trough while the innermost section will be advanced between the cones of the opening device 8. The separation of the innermost section then takes place and its portions spread to lie adjacent the other sections on the sides of the trough.

It will be of course evident that if the section fed has only two folded portions the operation will be completed by the opening device 7 and the opening device 8 will be idle. In like manner if the paper section 118 is a single folded unit then both opening devices 7 and 8 will be idle.

Leaving the area of the opening device 5, the section fed by the unit 3 has now been separated or unfolded. As it is pushed beneath the succeeding feeder 9, a section to be inserted is dropped within the opened section 118.

If a third section is to be inserted in the already assembled material, a second opening unit 5 will follow the feeder 9 and this in turn will be followed by another feeder 9.

After the cover sheets or first sections have been opened and have passed out of the opener units all such sheets are kept open by guides parallel to the sides of the trough until all inserts have been dropped into this cover sheet. The guides will then present the completed book for closing and delivery.

The closing and delivering unit is shown at the extreme right of Fig. 1 associated with the folding means 11.

The foundation or frame 1 is extended beyond the length of conveyor 2 to provide a support or a frame 148. Journalled in this frame 148 is a shaft having at one end a bevel gear 150 in mesh with gear 151 on the sprocket wheel 116. At the opposite end of the frame shaft 149 projects to carry a keyed sprocket wheel 152. Across the top of the frame 148 extends a fan shaft 153. This has a sprocket 154 driven by sprocket wheel 152 through chain 155.

As illustrated in Fig. 18 shaft 153 has outwardly extending fan fingers 156. These are three in number.

An inclined wall 157 extends across the frame and forms a continuation of trough 4 and side pieces 106. Wall 157 is slotted as shown in Fig. 17 to permit the rotation of the fan fingers 156. The bottom edge of wall 157 has a concave hollow foot 158 which forms a continuation of the bottom of trough 4. Foot 158 is also slotted as shown in 159.

Across the end of wall 157 extends an adjustable stop 160 suitably mounted on bars 161 in the frame 148.

A worm gear 162 is keyed to shaft 149 and engages a large gear 163 keyed on a short shaft 164 which extends inwardly of the frame. At its other end shaft 164 has a bevel gear 165. This is part of a shaft 166 extending lengthwise of the frame. Suitably spaced along shaft 166 are pulley wheels 167. Between pairs of pulley wheels 167 is arranged an eccentric wrist pin 168. These wrist pins form bearings for rock arms 169. The upper portions of the rock arms form stirrups 170 which in one position are continuations of the concave foot 158.

Extending downwardly from the rock arms 169 are pins 171. These are loosely journalled in holes transversely of the rock shaft 172.

As shown in Fig. 18 a pedestal 173 is mounted beyond the opposite side of the frame 148. This pedestal carries a shaft 174 having a roller 175.

A series of belts 176 extend over the pulley wheels 167 and the roller 175. A series of tensioning idlers 177 are mounted on a rock arm 178 of pedestal 173.

Beneath the frame 148 and at the right of Fig. 17 will be seen a tensioning rock arm 179. This carries a stud shaft 180 which forms a bearing for a sprocket wheel 181. Chain 154 is brought around an idler 182 and then around the tensioning sprocket 181.

To summarize the operation of the machine, it will be evident that a single rotation of shaft 31 will deliver two cover sections from the feeder cylinder 3. Each cover section falls with its half-page fold at the bottom of trough 4 in advance of one push bar 117. The chain drive 112 advances to push bars 117 at an appropriate speed. Each cover section 118 as it approaches the opening unit 5 is unfolded or opened in a manner illustrated in Fig. 16. As stated above the unfolding operation is applied to each folded part of section 118.

The completely unfolded section is held out toward the side walls of the trough 4 and side pieces 106 by spreaders 147.

Immediately following the opening unit 5 the section comes beneath the inserting unit 9. This is similar to the feeding section 3. Here the folded section is inserted within the unfolded or opened cover section.

Beyond the inserting unit 9 the last inserted section may be unfolded or opened by a second opening unit similar to 5.

After all insertions have been made the material is projected upon the foot 158 forming part of the closing and delivery unit. This foot is a continuation of one side of the trough 4 and one side piece 106. A suitable converging guide may direct the opposite side of the opened sections toward the wall 157.

The push bars 117 drop down and return to the opposite end of the machine.

The folding and delivery unit is operated in timed sequence from sprocket wheel 116. In successive order, the concave foot 158 is given a compound oscillation raising the fold of the cover section 118, moving laterally to drop it on the conveyor bands 176 at a point out of line with the trough 4.

Simultaneously the fingers 156 have thrown the upper free edges of the section 118 over upon the conveyor bands 176 or more properly upon the preceding paper section already deposited there.

Thus the successive sections are dropped in an overlapping pile upon the moving bands 176 and the concave foot 158 is ready to receive another paper section 118.

The shaft 153 rotates at one-third of the speed of the shaft 166.

Reserving the right to make such minor changes in detailed structure or proportion as will come within the scope of the following claims.

What we claim is:

1. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, means on said roll for peeling the said lowermost section from the stack and coiling it around the roll, means for supporting the remaining sections and means for releasing the section from the roll at a predetermined point in its travel.

2. Means for handling folded newspaper sections comprising a hopper for holding a stack of sections, means associated with the hopper for positioning the lowermost section, a rotary drum beneath the hopper, a plurality of transfer rolls carried by said drum, means for giving each roll an orbital movement, means on each of said rolls for successively peeling a section from the base of the stack, and coiling the section around a roll, means for supporting the remaining sections of the stack, and means for releasing the coiled sections from the rolls at predetermined points in their travel.

3. Means for handling folded newspaper sections comprising a hopper for holding a stack of sections, a lipped plate projecting inwardly of the base of the hopper along one side, a supporting ledge projecting inwardly from the opposite side of the hopper, a roller in advance of said ledge, a rotary brush operating through the side wall of the hopper above the lipped plate to position the lowermost section, a rotary drum beneath the hopper, a transfer roll carried by said drum, means for giving the roll an orbital movement, means on said roll for peeling the said lowermost section from the stack and coiling it around the roll, means for supporting the remaining sections and means for releasing the section from the roll at a predetermined point in its travel.

4. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, means on said roll for peeling the said lowermost section from the stack and coiling it around the roll, a series of supporting rolls spaced around the drum behind the transfer roll, endless travelling bands carried by said rolls, means for effecting rotation of the transfer roll and of the supporting rolls, and means for releasing the section from the transfer roll at a predetermined point in its travel.

5. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, means on said roll for peeling the said lowermost section from the stack and coiling it around the roll, a series of supporting rolls spaced around the drum behind the transfer roll, endless travelling bands carried by said rolls, a fixed rack concentric with said drum, gears on said transfer roll and supporting rolls in engagement with said rack, and means for releasing the section from the transfer roll at a predetermined point in its travel.

6. Means for handling folded newspaper sections comprising a hopper for holding a stack of sections, means associated with the hopper for positioning the lowermost section, a rotary drum beneath the hopper, a plurality of transfer rolls carried by said drum, means for giving each roll an orbital movement, means on each of said rolls for successively peeling a section from the base of the stack, and coiling the section around a roll, a series of supporting rolls spaced around the drum behind each transfer roll, means for adjusting the spacing of the end rolls of each series relative to the adjacent transfer roll, endless travelling bands carried by said rolls, means for effecting rotation of the transfer rolls and of the supporting rolls, and means for releasing the sections from the transfer rolls at predetermined points in their travel.

7. Means for handling folded newspaper sections comprising a hopper for holding a stack of sections, means associated with the hopper for positioning the lowermost section, a rotary drum beneath the hopper, a transfer roll carried by the drum, means for giving the roll an orbital movement, a series of ports longitudinally of the roll, vacuum passages connecting the ports with the shaft of the roll, a passageway in the shaft, a connecting passageway on the drum, valve means for applying vacuum to said passageway during a portion of the travel of the drum, pivoted fingers between said ports, and means for swinging said fingers away from the cylinder at predetermined points in the drum's travel.

8. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, means on said roll for peeling the said lowermost section from the stack and coiling it around the roll, means for supporting the remaining sections, means for releasing the section from the roll at a predetermined point in its travel, and guards confining the section around the roll during its movement.

9. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, suction means on the roll for peeling the said lowermost section from the stack and coiling it around the roll, means for supporting the remaining sections, and pressure means for releasing the section from the roll at a predetermined point in its travel.

10. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, fingers rockingly mounted on the roll for gripping an edge of said lowermost section and peeling it from the stack, means for supporting the remaining sections and means releasing said fingers from the section at a predetermined point in the drum's travel.

11. Means for handling folded newspaper sections comprising a hopper for holding a stack of sections, means associated with the hopper for positioning the lowermost section, a rotary drum beneath the hopper, a transfer roll carried by said drum, means for giving the roll an orbital movement, pins rockingly mounted on the roll for piercing an edge of said lowermost section and peeling it from the stack, means for supporting the remaining sections and means retracting said pins from the section at a predetermined point in the drum's travel.

12. In combination, a trough, means for withdrawing a folded newspaper cover section from a stack and transferring it to said trough, a pair of opposed rotary cones overlying the trough, divergent spreading guides beyond the cones, pneumatic means for causing the cones to unfold the said newspaper section and converging means for advancing the section past the cones.

13. In combination, a trough, means for withdrawing a folded newspaper cover section from a stack and transferring it to said trough, a pair of opposed rotary cones overlying the trough, pneumatic means for causing the cones to unfold the newspaper section, converging guides in front of said cones, divergent spreading guides beyond the cones and conveying means for advancing the said section past the cones.

14. In combination, a trough, means for withdrawing a folded newspaper cover section from a stack and transferring it to said trough, a pair of opposed rotary cones overlying the trough, pneumatic means for causing the cones to unfold the newspaper section, converging guides in front of said cones, centrally spaced spreading guides beyond the cones and conveying means for advancing the said section past the cones.

15. In combination, a trough, means for withdrawing a folded newspaper cover section from a stack and transferring it to said trough, a plurality of pairs of opposed rotary cones overlying the trough, pneumatic means for causing the cones to unfold the newspaper sections with which they are brought into contact, converging guides in front of the first pair of said cones, divergent spreading guides beyond each pair of cones, spaced parallel guides between each pair of guides and conveying means for advancing the section past the cones.

16. In combination, a trough, means for withdrawing a folded newspaper cover section from a stack and transferring it to said trough, a pair of opposed rotary cones overlying the trough, pneumatic means for causing the cones to unfold the newspaper section, means for rotating the cones in opposite directions in unison, converging guides in front of said cones, divergent guides beyond the cones, and conveying means for advancing the said section past the cones.

ISIDOR TORNBERG.
HANS C. JORDHOY.